United States Patent [19]
Stewart

[11] 3,758,134
[45] Sept. 11, 1973

[54] BREAKAWAY STEP FOR HIGH-CLEARANCE VEHICLES

[76] Inventor: George E. Stewart, R.F.D. 1, Hamilton, Kans. 66853

[22] Filed: Oct. 18, 1971

[21] Appl. No.: 189,961

[52] U.S. Cl. .............................................. 280/163
[51] Int. Cl. ........................................... B60r 3/021
[58] Field of Search ................... 280/166, 163, 164; 182/88, 91

[56] References Cited
UNITED STATES PATENTS

| | | | |
|---|---|---|---|
| 3,266,594 | 8/1966 | Antosh | 280/166 X |
| 3,329,443 | 7/1967 | Lowder | 280/166 |
| 3,671,058 | 6/1972 | Kent | 280/166 |
| 3,388,925 | 6/1968 | Chavira | 280/166 |
| 895,069 | 8/1908 | Buckwalter | 280/166 |

Primary Examiner—Leo Friaglia
Assistant Examiner—Robert R. Song
Attorney—Harvey B. Jacobson

[57] ABSTRACT

A breakaway step construction which lends itself to reliably safe use on the frame structure of a high-clearance wheel supported vehicle. It comprises a mounting bracket supported in a vertical position from the vehicle frame, said bracket supporting the a horizontal arm. An ample but suitably small step is fixedly mounted on an outward end of the arm. Novel means serves to pivotally mount the inward end of the arm on the bracket in a manner to permit the arm and step to swing through an arcuate path in the event the step strikes an object while the vehicle is moving. Pressure responsive means fixedly joins the inner pivoted end of the arm to the bracket. It functions to retain the arm and step in an outstanding normally accessible position and permits the same to swing and retract to an out-of-the-way position, whenever necessary or desired.

2 Claims, 4 Drawing Figures

PATENTED SEP 11 1973　　　　　　　　　　　　　3,758,134

3,758,134

BREAKAWAY STEP FOR HIGH-CLEARANCE VEHICLES

The present invention relates to a special purpose step construction which is expressly designed and adapted to be fixedly and supportively mounted on a high-clearance wheel supported motor vehicle, more particularly, an adaptation which supports and maintains the outstanding step in a readily accessible and usable position but permits it to automatically swing to and assume a retracted or out-of-the-way position if and when the step collides with an obstruction, that is, while the vehicle is moving.

Stirrup-type steps for wheel supported conveyances and vehicles are of many and varied types. For general background information attention can be accorded the Edward A. Erikson vehicle step Ser. No. 642,215 in that it shows a suspended bracket with a tread plate positioned for conveniently accessible ascending and alighting purposes. For more significant information reference can be made to the Elmo Lowder et al. U.S. Pat. No. 3,329,443 in that it shows a swing-out step wherein an L-shaped arm is pivoted on a relatively stationary bracket, the horizontal portion thereof being provided with a step and spring latch means being provided to retain the step in either a swung-out position or a retracted swung-in position within the confines of the body.

An object of the present invention is to advance the art and, in so doing, to provide an adaptation which better serves the purposes of users and which lends itself to feasible and practical use when the vehicle is in use and also when the vehicle is parked and which embodies the use of a pressure responsive shear pin or equivalent means that minimizes the likelihood of damage to either the step or the vehicle if and when the step collides with an obstruction while the vehicle is moving. Briefly the improved step construction lends itself to acceptably reliable and safe utilization within the vicinity of an openable and closable door on a high-clearance wheel supported motor vehicle. A simple strap or bar member functions as a mounting bracket, this being designed and adapted to be fixedly and supportively mounted in a vertical position directly or indirectly on the vehicle. A horizontal arm is disposed in a plane at right angles to the vertical axis of the mounting bracket. A flanged anti-slipping step is fixedly mounted on an outward end of the arm. Novel means is provided to pivotally mount the inward end of the arm on a coordinating portion of the mounting bracket and functions to permit the arm and step to swing through an arcuate path, that is, under predetermined operating conditions. Pressure responsive means serves to fixedly join the pivoted inner end of the arm to the bracket, more particularly, in a manner to locate and position the arm and step in an outstanding normally accessible and usable position and automatically permits the arm and the step thereon to swing to and assume a safeguarding out-of-the-way position whenever necessary or desired.

More specifically, the pressure responsive means embodies a normally intact shear pin. In addition stabilizing and rigidifying brace means is provided whereby to thus provide a heavy duty step which is capable of coping with and supporting the weight of heavy individuals These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
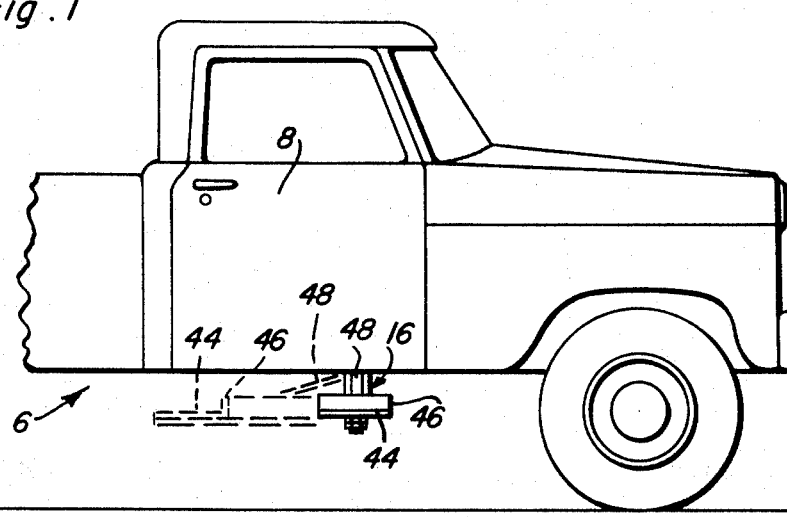
FIG. 1 is a view in side elevation showing a fragmentary portion of the aforementioned high-clearance pickup truck or equivalent vehicle and showing, what is more significant, the improved step construction in use in full lines, and swung to a retracted out-of-the-way position in phantom lines.
Figure 2:
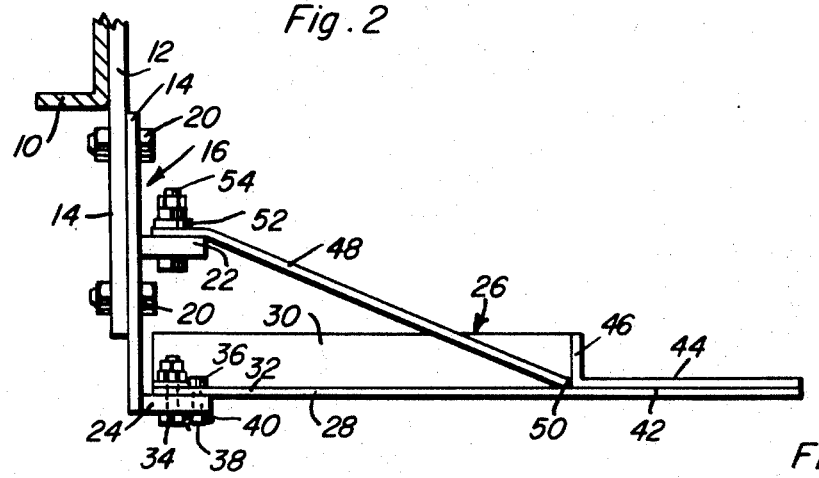
FIG. 2 is a view on a suitably enlarged scale showing the improved step construction and one manner of suspending and rigidly mounting the same.

The wheel supported vehicle in FIG. 1 is denoted by the numeral 6 and has to do with a high-clearance pickup truck or an equivalent vehicle. The openable and closable door with which the invention is directly associated is denoted at 8. With reference to FIG. 2 the numeral 10 designates a part of the chassis or frame on which the invention is supportively mounted. Ordinarily and to the ends desired, a rigid strap type hanger bracket or adaptor is utilized as at 12, the same being fixed to the frame and having a portion 14 depending below the frame to accommodate the unique step construction.

The step construction comprises a flat-faced rigid bar which is here designated as a mounting bracket 16. A major portion of this bracket is superimposed on the adaptor bracket 12 and is bolted thereto by way of bolt holes 18 and associated nut-equipped bolts 20. One side or face of the bracket 16 is provided with a first outstanding lug 22 and a second outstanding lug 24 aligned with but below the lug 22.

The aforementioned horizontal arm is denoted by the numeral 26 and comprises a rigid appropriately long angle iron the bottom of horizontal flange of which is denoted at 28 the upstanding vertical flange at 30. An inner end portion 32 of the flange 28 is superimposed on the upper surface of the lug 24 where it is pivotally connected to said lug by way of a bolt and nut assembly 34. Holes are provided adjacent the pivot bolt to accommodate an insertable, removable and renewable shear pin, that is a headed pin 36 whose shank is passed through the holes provided therefor, the shank depending below the lug, as at 38, and being held in place by a cotterkey or the like 40. The outer extending end portion 42 of the flange 28 of the angle iron serves to support the aforementioned stirrup-type step, more particularly, a tread plate 44 which is fixed in place and whose upper surface is appropriately milled or knurled (see FIG. 3) to provide an anti-slipping surface. The inner end portion of the plate is provided with an upstanding flange 46 which constitutes a limit stop shoulder, that is, a stop shoulder for the foot of the user while safely entering the vehicle or leaving the same and alighting, as the case may be.

For best results it has been found that the arm and step means can and should be rigidified. To accomplish this an elongated strap type diagonal brace is provided as at 48, the outer or forward end of the brace 50 being securely welded to the adjacent surface of the flange 46 as brought out with particularity in FIG. 2. The upper or inward end of the brace is laterally bent at 52 and is superimposed on the upper lug 22 and is retained in place by bolt and nut means as at 54.

Figure 3:
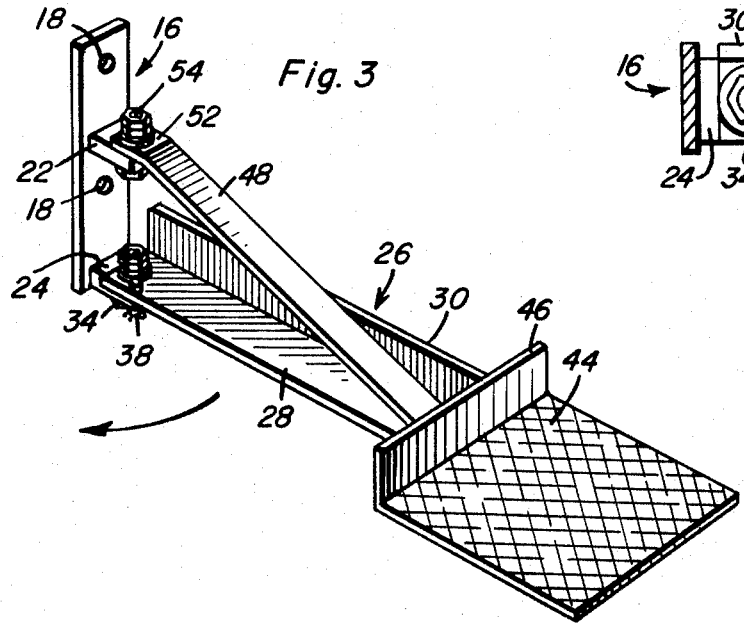
FIG. 3 is a view in perspective of the overall step construction by itself.
Figure 4:
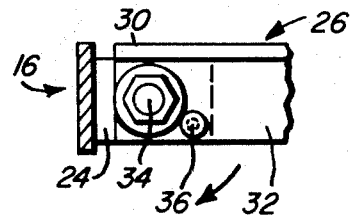
FIG. 4 is a fragmentary horizontal section on a scale sufficient to emphasize the pivoted end of the arm and the frangible shear pin.

It is reiterated that the herein disclosed break-a-way step construction lends itself for reliable and practical use when the vehicle is in use and also when the vehicle is parked and is such in construction and adaptability that it can be readily attached to the frame of the vehicle preferably by way of the aforementioned adaptor or supporting bracket 12. In actual practice (not shown) steps of the type shown in FIG. 3 are mounted on the left and right sides of the vehicle for cooperation with the coacting openable and closeable doors. It would be within the purview of the invention, it is submitted, to utilize locking means for the arm other than a shear pin, that is an appropriate arm retaining but frangible joint. Practice has shown however that it is desirable to bolt the inner end portion and clamp it in place on a lug at the lower end of the mounting bracket 16. Then too, experience has also shown that the utilization of a readily insertable and removable shear pin, employed in the manner illustrated, well serves the purposes for which this feature of the invention is utilized. Experience has shown that if the step accidentally hits an obstruction while the vehicle is moving the step will swing, usually in the direction of the arrow to the left in the views of the drawing. On the other hand, it is capable of swinging in an opposite or forward direction. In either event damage to either the step or vehicle is minimized even if the step collides with a relatively stationary obstruction. Should the step be broken either forward or aft it is usually a simple matter to replace it in its original position either by pulling it back into position against or replacing the shear pin.

It is submitted that a consideration of the views of the drawing singly and collectively will enable the reader to comprehend the construction, features and advantages and preferred manner of using the invention. Under the circumstances, a more extended description is deemed to be necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A safety-type breakaway step construction for a high-clearance pickup truck or the like comprising: a rigid elongated bar constituting a mounting bracket and adapted to be vertically superimposed upon and bolted to a relatively stationary adapter bracket, said bracket having a median portion provided with a first outstanding lug and a lower end portion provided with a second outstanding lug, a horizontally elongated angle iron providing a step supporting arm and embodying a horizontal flange and an upstanding vertical flange, said horizontal flange having an inward end positioned atop and pivotally bolted to said second lug and an outer end portion extending outwardly beyond a corresponding outer end of said vertical flange, a normally intact but pressure responsive shear pin carried by said inward end portion and passing through and joining the same to said second lug, a stirrup-type step fixed atop the outer extending end portion of said horizontal flange and having an integral upstanding flange serving as a safeguarding stop shoulder for the user's foot and firmly abutting an outward end of said vertical flange a stabilizing and regidifying brace located in a plane above the upper surface of said horizontal flange and having an upward inner end rigidly secured to said first lug and an outward lower end joined to a coacting portion of said horizontal flange and an associated surface portion of said upstanding stop shoulder.

2. The step construction defined in claim 1 and wherein said intact shear pin functions to locate and position said arm and step in an outstanding normally accessible and usable position and when fractured as a result of a collision permits said arm and step to swing, either forwardly or rearwardly, to a breakaway out-of-the-way position.

* * * * *